United States Patent
Yasrebi et al.

(10) Patent No.: US 8,180,032 B2
(45) Date of Patent: May 15, 2012

(54) METHODS AND SYSTEMS FOR PROTECTING A TELECOMMUNICATION SERVICE FROM DENIAL OF SERVICE (DOS) ATTACK

(75) Inventors: Mehrad Yasrebi, Austin, TX (US); Bernard S. Ku, Austin, TX (US); Chaoxin Charles Qiu, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1404 days.

(21) Appl. No.: 11/801,992

(22) Filed: May 11, 2007

(65) Prior Publication Data
US 2008/0279362 A1    Nov. 13, 2008

(51) Int. Cl.
*H04M 3/00*    (2006.01)

(52) U.S. Cl. ............ 379/189; 379/188; 379/44; 379/45; 726/23

(58) Field of Classification Search ............ 379/44, 379/45, 188, 189, 221.06; 370/242, 352; 726/23
See application file for complete search history.

(56) References Cited

U.S. PATENT DOCUMENTS

| | | | |
|---|---|---|---|
| 5,323,444 A | 6/1994 | Ertz et al. | |
| 6,775,534 B2 | 8/2004 | Lindgren et al. | |
| 6,807,409 B1 | 10/2004 | Davidson et al. | |
| 6,968,050 B1 | 11/2005 | Pershan et al. | |
| 7,116,967 B2 | 10/2006 | Kauppinen et al. | |
| 2002/0111159 A1 | 8/2002 | Faccin et al. | |
| 2002/0163906 A1 | 11/2002 | Diachina et al. | |
| 2004/0001572 A1 | 1/2004 | Chin et al. | |
| 2004/0022366 A1 | 2/2004 | Ferguson et al. | |
| 2004/0122934 A1 | 6/2004 | Westman et al. | |
| 2004/0190522 A1 | 9/2004 | Aerrabotu et al. | |
| 2004/0198310 A1 | 10/2004 | Aerrabotu et al. | |
| 2004/0199914 A1 | 10/2004 | Aerrabotu et al. | |
| 2005/0083911 A1 | 4/2005 | Grabelsky et al. | |
| 2005/0105464 A1 | 5/2005 | Acharya et al. | |
| 2005/0286695 A1 | 12/2005 | Pershan et al. | |
| 2006/0063510 A1 | 3/2006 | Wills et al. | |
| 2006/0174009 A1 | 8/2006 | Martiquet et al. | |
| 2006/0182029 A1 | 8/2006 | Kealey et al. | |
| 2007/0022289 A1* | 1/2007 | Alt et al. ................. | 713/168 |
| 2007/0032219 A1 | 2/2007 | Rudolf et al. | |
| 2007/0061397 A1* | 3/2007 | Gregorat et al. ........... | 709/203 |
| 2008/0222724 A1* | 9/2008 | Ormazabal et al. ......... | 726/23 |

* cited by examiner

*Primary Examiner* — Antim Shah
(74) *Attorney, Agent, or Firm* — Toler Law Group, PC

(57) ABSTRACT

A client of a telephone number mapping (ENUM) server is used to protect the ENUM server from a Denial of Service (DoS) attack. The DoS attack may comprise a plurality of attempts to place exception calls from one or more end user devices that are unregistered. The one or more end user devices may originate from a service provider network.

18 Claims, 4 Drawing Sheets

METHODS AND SYSTEMS FOR PROTECTING A TELECOMMUNICATION SERVICE FROM DENIAL OF SERVICE (DOS) ATTACK

FIELD OF THE DISCLOSURE

The present disclosure is generally related to methods and systems for protecting telecommunication services.

BACKGROUND

Multimedia services, such as voice, video and messaging services, are increasing in popularity. A core component of many Voice over Internet Protocol (VoIP) services is a telephone number mapping (ENUM) service. The ENUM service converts telephone numbers to host names. The ENUM service may be shared by multiple service providers and used in peering network agreement arrangements.

Some multimedia services do not require registration of customers' devices before the devices can initiate calls. Examples of such multimedia services include some VoIP services, promotional Web sites, anonymous multimedia chat services and customer service portals.

In contrast, other multimedia services may require registration before enabling the customers' devices to initiate calls to various callees. These multimedia services may allow unregistered devices a privilege of making some exception calls, which is defined as sessions/calls that are allowed to take place (and thus are not rejected) even if the required registration acts have not yet been carried out, but rejecting other outgoing calls. The exception calls may include emergency calls to 911 or 311. Exception calls may be allowed by either: modifying customer premises equipment (CPE) devices to simulate dial tones, modifying Internet Protocol Multimedia Subsystem (IMS) databases, introducing non-standard packets, using mobile technologies, or modifying an ENUM server.

DETAILED DESCRIPTION OF THE DRAWINGS

Figure 1:
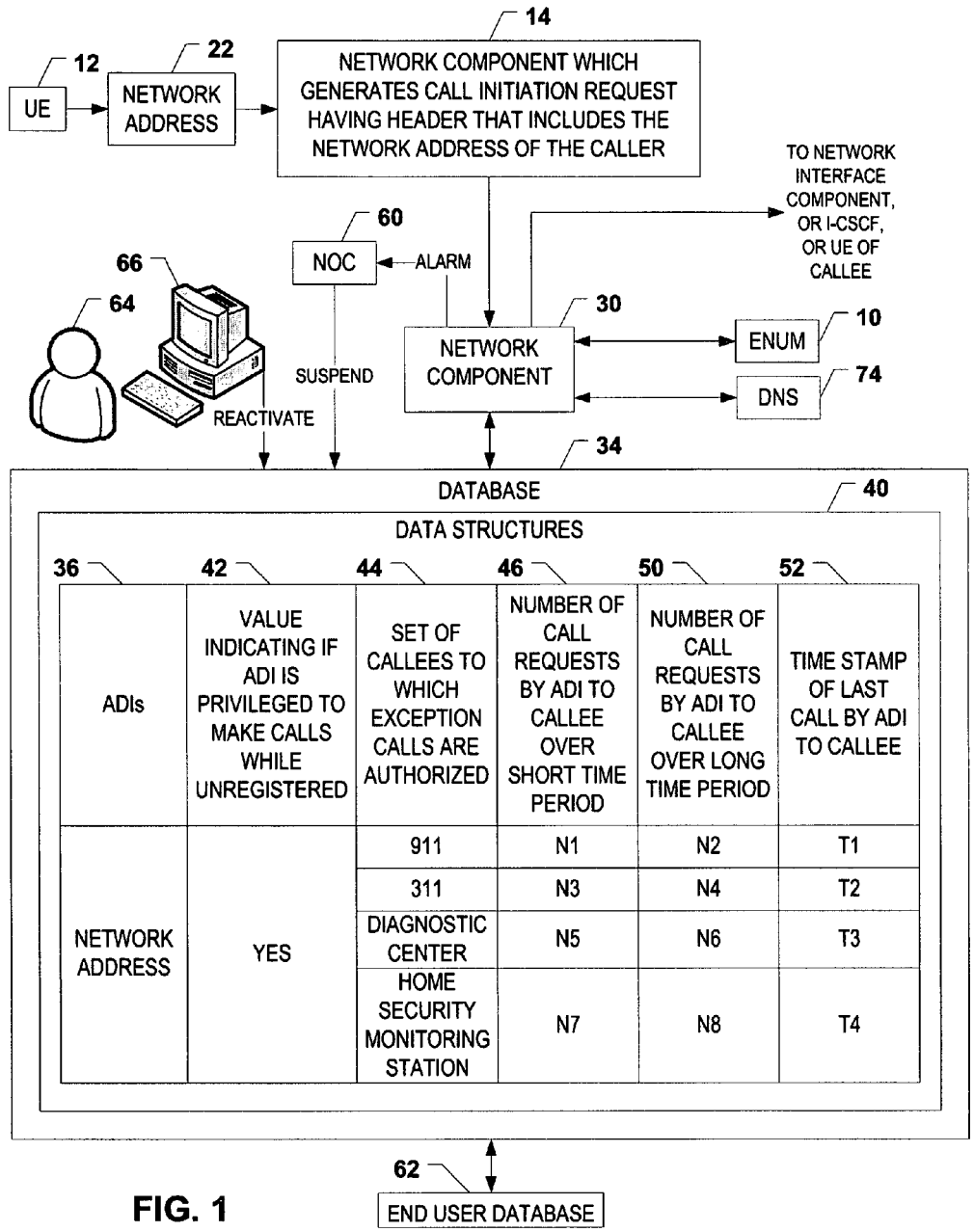
FIG. 1 is a block diagram of an embodiment of a system for protecting an ENUM server and other telecommunication resources.

Attacks on a service provider's equipment can be disguised as attempts to initiate sessions for exceptional calls (herein referred to as "exceptional sessions"). The ENUM server, being a network component service common to many service implementations, may be a target for the attacks. Even if the ENUM server has a mechanism for defending against abuse, the mechanism may overload the ENUM server and/or may be otherwise insufficient to thwart such abuse.

A need exists to thwart attacks against the ENUM server and other multimedia infrastructure services where: the attacks are disguised as allowed exception calls; and/or the ENUM server either does not have protection against the attacks or is undesirably slow or possibly rendered useless as its defensive mechanism expends processing effort defending against the attacks.

Disclosed herein are embodiments of methods and systems for a core ENUM client component (e.g. a client of an ENUM service) to identify, capture, handle and recover from Denial of Service (DoS) and other attacks against the ENUM service where such attacks are disguised as authorized exception calls from unregistered devices. Embodiments identify patterns of excessive use of multimedia service systems whose service providers allow regular, promotional, diagnostics, emergency and/or other calls to be made by unregistered devices. Also disclosed are embodiments of core service components (e.g. a core ENUM client component) that protect their downstream components (e.g. an ENUM service queried by the core ENUM client component). Various core service components can protect an ENUM server that otherwise does not have proper protection and/or may be overloaded in defending itself. The ENUM service may be a private server queried and otherwise used by only one service provider, or may be a shared server that is queried and otherwise shared by multiple service providers.

Further disclosed are embodiments to implement protection schemes based on service level agreements among peering networks. For example, embodiments may provide a facility to enforce and honor peering Service Level Agreement arrangements between service providers (e.g. including an ENUM peering service provider).

Still further disclosed are embodiments for automatically removing and/or disabling privileges from unregistered devices in response to detecting excessive use by such devices. Yet still further disclosed are embodiments for a service provider to reinstate privileges to an unregistered device, per its policy. Each service provider may have its own policy (e.g. its own conditions) for reinstating privileges.

Thus, embodiments enable a service provider to offer regular, emergency, diagnostics and/or promotional service to its clients who may not have registered their devices (e.g. to unregistered VoIP customers) while protecting the service provider's network and its partners' networks from excessive use by devices within/originating from the service provider's network. Embodiments of algorithms to detect and protect against the attacks are applicable to various multimedia environments that use core ENUM client components to allow limited exception calls by unregistered devices. Alternatively, the core ENUM client components may allow calls without requiring registrations. The embodiments may modify standardized technologies (e.g. IMS), may be implemented using proprietary technologies, may use a variety of protocols (e.g. Session Initiation Protocol (SIP) or Media Gateway Control Protocol (MGCP)), and may be applied to various multimedia technologies (e.g. voice, video and messaging).

Embodiments are described with reference to FIG. 1, which is a block diagram of an embodiment of a system for protecting an ENUM server 10 and other telecommunication resources, and FIG. 2, which is a flow diagram of an embodiment of a method of protecting the ENUM server 10 and other telecommunication resources from attacks such as DoS attacks resulting from misbehaving call requests from end users in a service provider's network. Examples of the other telecommunication resources include, but are not limited to, Domain Name System (DNS) resources, media servers, application servers such as feature servers, and subscriber databases.

Consider a user equipment (UE) device 12 that is served by a service provider, but may be unregistered with the service provider. The UE device 12 is used to attempt to initiate a call via the service provider. A network component 14, which is typically owned or otherwise controlled by the service provider, is contacted by the UE device 12 based on the attempt to initiate the call. The network component 14 is a client to the ENUM server 10, and thus may be referred to as a core ENUM client component.

The network component 14 may be contacted by receiving a call initiation request 16 from the ULE device 12. The call initiation request 16 may have various forms based on which protocol is used. For example, the call initiation request 16 may comprise an INVITE message if a Session Initiation Protocol (SIP) is used. Other forms of the call initiation request 16 are within the scope of this disclosure for other protocols (e.g. MGCP). The call initiation request 16 includes a telephone number 18 of an intended callee. The telephone number 18 of the intended callee may comprise an E.164 telephone number, for example.

In response to receiving the call initiation request 16, the network component 14 sends a response 20 to the UE device 12. Further in response to receiving the call initiation request 16, the network component 14 extracts a network address 22 of the UE device 12 and generates a new call initiation request message 24 that comprises a header 26 that includes the network address 22. The network address 22 may comprise an Internet Protocol (IP) address associated with the UE device 12. In a particular embodiment, the new call initiation request message 24 comprises a new INVITE message that comprises the telephone number 18 of the intended callee, and further comprises the header 26 that includes the network address 22.

The network component 14 sends the call initiation request message 24 to a network component 30. The network component 30 is typically owned or otherwise controlled by the service provider. The network component 30 also is a client to the ENUM server 10, and thus may be referred to as a core ENUM client component.

The network components 14 and 30 may have different implementations in different embodiments. For example, the network components 14 and 30 may be suited for IMS implementations. In an IMS implementation, the network component 14 may be embodied by a Call Session Control Function (CSCF) such as a Proxy-CSCF (P-CSCF) and the network component 30 may be embodied by another CSCF such as a Serving-CSCF (S-CSCF). The P-CSCF and the S-CSCF may communicate via an Interrogating-CSCF (I-CSCF). Alternatively, the network components 14 and 30 may be suited for non-IMS implementations. For example, the network components 14 and 30 may be embodied by one or more multimedia feature servers. The one or more multimedia feature servers may contain the functions of the network components 14 and 30 in one or more physical servers. In another non-IMS implementation, the network component 14 is embodied by a Session Border Controller (SBC).

In response to receiving the call initiation request message 24, the network component 30 sends a response 32 to the network component 14. The network component 30 extracts the network address 22 from the header 26. The network component 30 uses the network address 22 and/or the telephone number 18 of the intended callee to determine whether or not to query the ENUM server 10 based on the call initiation request message 24.

In an embodiment, the network component 30 cooperates with a database 34 that is provisioned by the service provider. The database 34 may store a set of allowed device identifiers (ADIs) 36 that identify which user equipment devices are allowed to initiate call requests. In a particular embodiment, the set of ADIs 36 comprise network addresses such as Internet Protocol (IP) addresses associated with the allowed devices. Based on the set of ADIs 36, either some or no user equipment devices may be excluded from being allowed to initiate call requests. Optionally, the network component 30 may use a single "all devices" value to cause all devices to be deemed allowed to initiate call requests.

The database 34 may store a set of data structures 40, wherein each of the data structures 40 is associated with a respective one of the ADIs 36. Each data structure may include a respective flag 42 indicating whether or not a device identified by its respective ADI is privileged to make calls while unregistered. The flag 42 may indicate yes/no, true/false, or another like indication of the privilege.

Each data structure may further comprise a respective set of authorized callees 44 to which exception calls can be made from the device identified by its respective ADI. Examples of the set of authorized callees 44 include a first emergency telephone number such as 911, a second emergency telephone number such as 311, a diagnostic center telephone number for the service provider, a billing telephone number for the service provider, a customer service telephone number for the service provider, and a home security monitoring station telephone number. In general, some of the ADIs 36 may have the same set of authorized callees 44, and others of the ADIs 36 may have different sets of authorized callees 44.

Each data structure may further comprise at least one count of a number of call requests made by the device identified by its respective ADI. In an embodiment, each data structure comprises at least one count of a number of call requests over a time period per device per allowed destination callee. In a particular embodiment, each data structure includes a set of first counts 46 of numbers of call requests over a first time period per device per allowed destination callee, and a set of second counts 50 of numbers of call requests over a second time period per the device per the allowed destination callee, wherein the first time period is less than the second time period. For example, the first time period may be an hour, and the second time period may be a month. The first counts 46 are indicative of transient behaviors of making call requests, and the second counts are indicative of persistent behaviors of making call requests. It is noted that each data structure can store alternative measures of transient and persistent behaviors of making call requests either instead of or in addition to the counts.

Each data structure may further comprise a set of time stamps 52 of call requests made by the device. Each time stamp indicates a time of a last call by the device to a respective authorized callee.

In an embodiment, a network operation center (NOC) 60 of the service provider cooperates with the network component 30 and/or the database 34. The NOC 60 may comprise a server complex to perform network monitoring and service operation functions. The NOC 60 communicates, to the network component 30, a list of which ADIs are privileged to make calls while in an unregistered state, and the associated exception callee numbers for these ADIs. The network component 30, in turn, updates any flags and any sets of authorized callees in the database 34 as directed by the NOC 60.

The network component 30 cooperates with the database 34 to maintain operational data per authorized device and per allowed destination callee (e.g. the counts of call requests and the time stamps). The network component 34 uses the operational data to process the call initiation request message 24.

Data in the database 34 of the network component 30 may be shared and/or synchronized with an end user database 62. The end user database 62 may store data for a plurality of databases of a plurality of network components that act to protect the ENUM server 10 from attacks.

Figure 3:
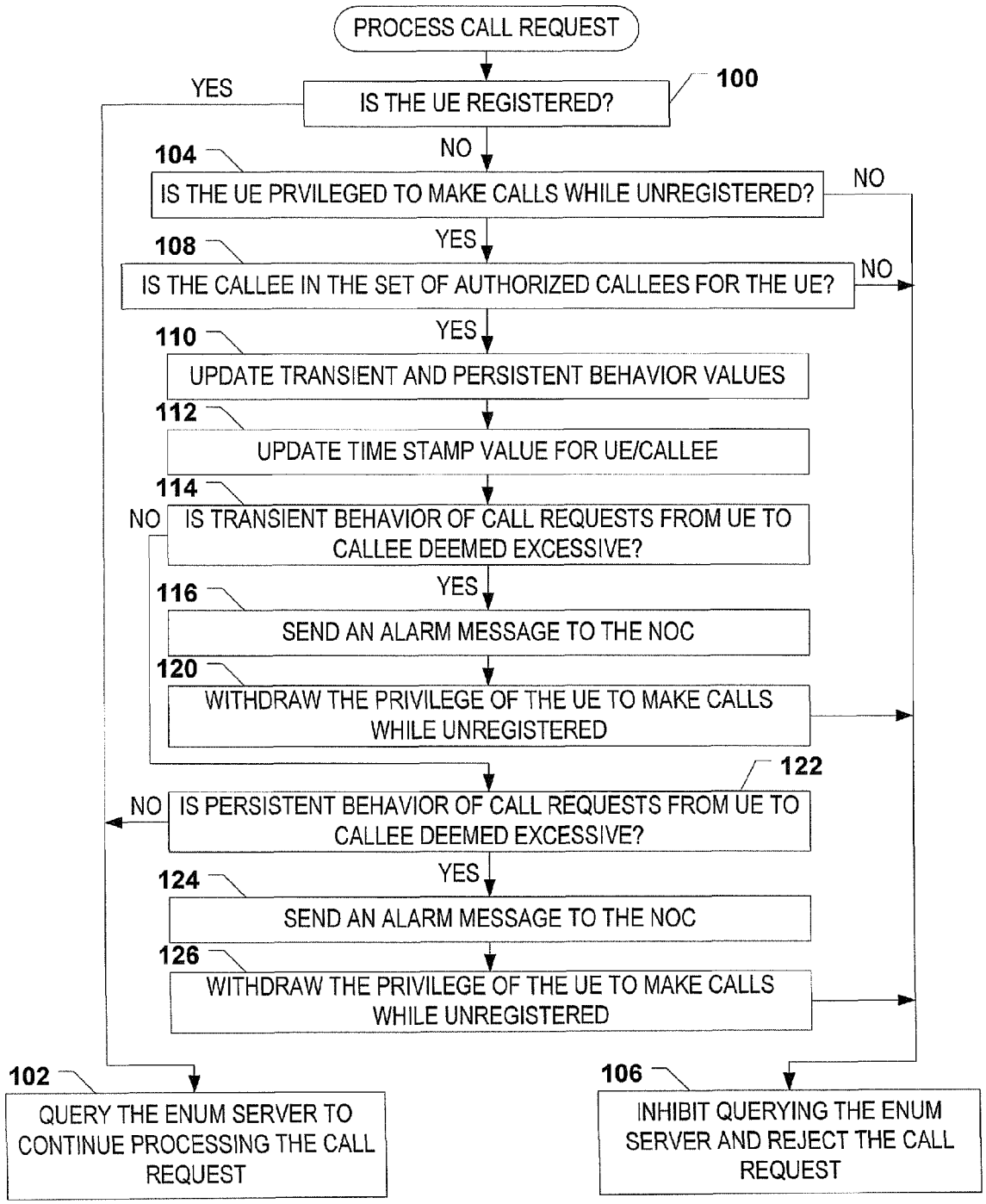
FIG. 3 is a flow chart of an embodiment of a method of processing a call initiation request message by a network component in order to protect the ENUM server and other telecommunication resources.

FIG. 3 is a flow chart of an embodiment of a method of processing the call initiation request message 24 by the network component 30 in order to protect the ENUM server 10. In general, the method can be performed by a component that is outside the ENUM server 10, such as by a core ENUM client component that is a client to the ENUM server 10.

As indicated by block 100, the method comprises determining if the UE device 12 is registered or is generally allowed to initiate call requests. The network component 30 may determine if the UE device 12 is registered based on the network address 22. If the UE device 12 is registered or is generally allowed to initiate call requests, then the network component 30 queries the ENUM server 10 using the telephone number 18 to continue processing the call request (as indicated by block 102). If the UE device 12 is not registered, then the method comprises determining if the UE device 12 is privileged to make calls while in an unregistered state (as indicated by block 104). The network component 30 may access a respective one of the flags 42 associated with a respective one of the ADIs 36 identified by the network address 22 to determine if the UE device 12 is privileged to make calls while in an unregistered state.

If the UE device 12 is not privileged to make calls while in an unregistered state, the method comprises rejecting the call request (as indicated by block 106). In this case, the network component 30 does not query the ENUM server 10 in response, to the call initiation request message 24.

If the UE device 12 is privileged to make calls while in an unregistered state, the method comprises determining if the telephone number 18 is an element of the set of authorized callees 44 associated with the network address 22 (as indicated by block 108). If the telephone number 18 is not an authorized callee, then method comprises rejecting the call request (as indicated by block 106). In this case, the network component 30 does not query the ENUM server 10 in response to the call initiation request message 24.

If the telephone number 18 is an element of the set of authorized callees 44, the method comprises updating a transient behavior value and a persistent behavior value associated with call requests made from the network address 22 (as indicated by block 110). The transient behavior value may comprise or be based on a first count of a number of call requests made from the network address 22 to the telephone number 18 over the first time period and ending at the present time. The persistent behavior value may comprise or be based on a second count of a number of call requests made from the network address 22 to the telephone number 18 over the second time period and ending at the present time. The network component 30 determines and stores the transient behavior value and the persistent behavior value in the respective data structure associated with the network address 22 in the database 34.

As indicated by block 112, the network component 30 may update the time stamp value indicating a time of the present call request made from the network address 22 to the telephone number 18.

As indicated by block 114, the method comprises determining if the transient behavior value indicates an excessive transient behavior of call requests made from the network address 22 to the telephone number 18. This act may comprise comparing the transient behavior value to a transient behavior threshold. In a particular embodiment, the transient behavior value comprises a count of a number of call requests made in the preceding hour from the network address 22 to the telephone number 18, and the transient behavior threshold is four.

If the transient behavior value is greater than or equal to the transient behavior threshold, the transient behavior is deemed to be excessive by the network component 30.

If the transient behavior is deemed to be excessive, the network component 30 sends an alarm message to the NOC 60 (as indicated by block 116). The alarm message indicates that a transient excessive behavior is being exhibited for the ADI associated with the network address 22, and thus the ADI is being barred from the privilege of making calls while in an unregistered state. Based on the excessive transient behavior, the network component 30 withdraws the privilege of the UE device 12 to make calls while in an unregistered state (as indicated by block 120). To withdraw the privilege, the network component 30 may update the respective flag 42 associated with the network address 22 to "no", "false", or another like indication. The act of withdrawing the privilege of the UE device 12 may be performed either autonomously by the network component 30 or as directed by the NOC 60 after receiving the alarm message. The NOC 60 may direct the network component 30 to withdraw the privilege by sending a suspend-caller-credentials message to the network component 30.

If the transient behavior is deemed to be excessive, the method comprises rejecting the call request. Thus, in this case, the network component 30 does not query the ENUM server 10 in response to the call initiation request message 24.

As indicated by block 122, the method comprises determining if the persistent behavior value indicates an excessive persistent behavior of call requests made from the network address 22 to the telephone number 18. This act may comprise comparing the persistent behavior value to a persistent behavior threshold. In a particular embodiment, the persistent behavior value comprises a count of a number of call requests made in the preceding month from the network address 22 to the telephone number 18, and the persistent behavior threshold is twelve. If the persistent behavior value is greater than or equal to the persistent behavior threshold, the persistent behavior is deemed to be excessive by the network component 30.

If the persistent behavior is deemed to be excessive, the network component 30 sends an alarm message to the NOC 60 (as indicated by block 124). The alarm message indicates that a persistent abuse pattern is emerging for the ADI associated with the network address 22. Based on the excessive persistent behavior, the network component 30 may withdraw the privilege of the UE device 12 to make calls while in an unregistered state (as indicated by block 126). To withdraw the privilege, the network component 30 may update the respective flag 42 associated with the network address 22 to "no", "false", or another like indication. The act of withdrawing the privilege of the UE device 12 may be performed either autonomously by the network component 30 or as directed by the NOC 60 after receiving the alarm message. The NOC 60 may direct the network component 30 to withdraw the privilege by sending a suspend-caller-credentials message to the network component 30.

If the persistent behavior is deemed to be excessive, the method comprises rejecting the call request. Thus, in this case, the network component 30 does not query the ENUM server 10 in response to the call initiation request message 24.

In response to receiving an alarm message (either transient or persistent excessive use), the NOC 60 may perform an alarm handling algorithm. The alarm handling algorithm may cause the NOC 60 to contact one or more parties in response to receiving the alarm message. Examples of the parties include, but are not limited to, a network from which the excessive use originates, a user from which the excessive use originates, and a law enforcement authority. The NOC 60 may determine which parties to contact based on which callee number is being requested in the excessive pattern. The contact is initiated either to inform the one or more parties of the excessive behavior, or to determine the cause of the excessive behavior, or to stop the excessive behavior, or any combination thereof.

Caller credentials that have been withdrawn may be reactivated. Each service provider may have its own policy and/or legal constraints for reauthorizing a privilege to make calls in an unregistered state. For example, if the NOC 60 had received a persistent abuse alarm associated with an ADI, one or more investigative acts may be performed before deciding to reauthorize the ADI with privileges. The investigative acts may indicate a probable cause severity level on which a decision to reauthorize a privilege is based. Network personnel 64 may direct the network component 30 to reactivate a privilege by sending a reactivate-caller-credentials message from his/her computer 66 to the network component 30. Depending on the reason that a caller's privilege has been withdrawn, the network personnel 64 may require authorization/approval (e.g. in the form of a letter or another communication) from a security system, a police department, and/or a court before reactivating the privilege.

If the UE device 12 is privileged to make calls while in an unregistered state, and if the telephone number 18 is an element of the set of authorized callees 44, and if the transient behavior and the persistent behavior are not deemed excessive, then the network component 30 queries the ENUM server 10 using the telephone number 18 to continue processing the call request (as indicated by block 102).

Referring back to FIG. 2, the network component 30 sends a mapping inquiry 66 to the ENUM server 10 to continue processing the call request. The mapping inquiry 66 comprises the telephone number 18, such as an E.164 telephone number, of the callee. In response to the mapping inquiry 66, the network component 30 receives, from the ENUM server 10, a server IP name 70 associated with the telephone number 18. The network component 30 sends a mapping inquiry 72 to a Domain Name System (DNS) server 74. The mapping inquiry 72 comprises the server IP name 70 associated with the telephone number 18. In response to the mapping inquiry 72, the network component 30 receives a numerical IP address 76 associated with the server IP name 70. The network component 30 sends a call initiation request message 80, such as an INVITE message, based on the numerical IP address 76. The call initiation request message 80 may be sent to a user equipment device of the callee if the callee and caller share the same home network, or to a network interface component of a home network of the callee if the callee and caller have different home networks, or to an I-CSCF of an IMS network of the callee. In response to the call initiation request message 80, follow-on flows for the call request cause the call to be completed to the telephone number 18 of the callee. Different follow-on flows to complete the call are known to those having ordinary skill.

In this way, the UE device 12 when in an unregistered state can be used to make exception calls. Examples of the exception calls include emergency calls (e.g. to 911 or 311), home security system calls, service and equipment diagnostic calls, "becoming familiar with our service" promotional calls, and calls which provisioning and/or porting is pending.

Figure 2:
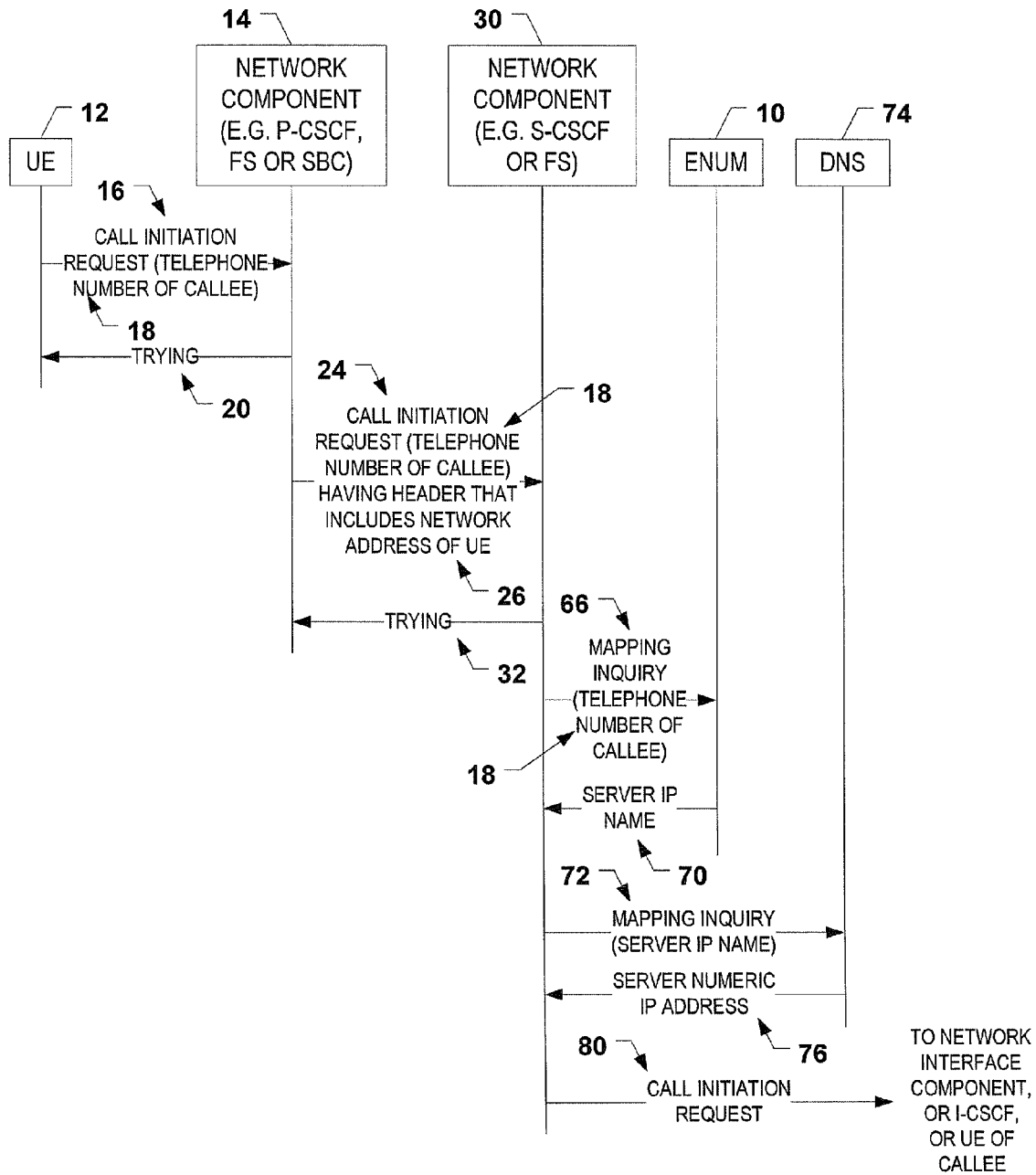
FIG. 2 is a flow chart of an embodiment of a method of protecting an ENUM server and other telecommunication resources.

A method described with reference to FIGS. 2 and 3 is performed multiple times for multiple call requests made by the UE device 12. For purposes of illustration and example, consider an embodiment of processing the following call requests made from the UE device 12 while in an unregistered state.

Consider a first attempt to place a first exception call from the UE device 12 to a telephone number. The network component 30 receives a first call initiation request message associated with the first attempt. Based on the first call initiation request, the network component 30 determines that the UE device 12 is privileged to make calls while in the unregistered state, and that the telephone number is an element of the set of authorized callees 44, and that the transient behavior and persistent behavior associated with the UE device 12 are not deemed excessive. Therefore, the network component 30 queries the ENUM server 10 in response to the first call initiation request message. Further processing is performed to complete a call to the telephone number based on the response from the ENUM server 10.

Thereafter, consider a second attempt to place a second exception call from the UE device 12 to the telephone number. The network component 30 receives a second call initiation request message associated with the second attempt. Based on the second call initiation request, the network component determines that a behavior of making call attempts from the UE device 12 is excessive. In response to determining that the behavior is excessive, the network component 30 inhibits querying the ENUM server 10 for the second call initiation request message. Therefore, no call is placed from the UE device 12 to the telephone number in response to the second attempt. Further in response to said determining that the behavior is excessive, a value is stored in the database 34 to indicate that a privilege of making subsequent exception calls from the UE device 12 is withdrawn.

Thereafter, consider a third attempt to place a third exception call from the UE device 12 to any telephone number. The network component 30 receives a third call initiation request message associated with the third attempt. Based on the value in the database indicating that the privilege of making subsequent exception calls from the UE device 12 is withdrawn, the network component 30 inhibits querying the ENUM server 10 for the third call initiation request message. Therefore, no call is placed from the UE device 12 to the telephone number.

Thereafter, consider a user of the UE device 12 communicating with the network personnel 64 to provide an explanation of the excessive behavior. If satisfied with the explanation and without any legal constraints, the network personnel 64 may direct the network component 30 to reactivate the privilege by sending a reactivate-caller-credentials message from the computer 66 to the network component 30. In response thereto, the value stored in the database 34 is updated to reauthorize the privilege of making exception calls from the UE device 12.

Thereafter, consider a fourth attempt to place a fourth exception call from the UE device 12 to a telephone number. The network component 30 receives a fourth call initiation request message associated with the fourth attempt. Based on the fourth call initiation request, the network component 30 determines that the UE device 12 is privileged to make calls while in the unregistered state, and that the telephone number is an element of the set of authorized callees 44, and that the transient behavior and persistent behavior are not deemed excessive. Therefore, the network component 30 queries the ENUM server 10 in response to the fourth call initiation request message. Further processing is performed to complete a call to the telephone number based on the response from the ENUM server 10.

Although FIG. 2 shows a single flag 42 associated with an ADI, multiple flags may be associated with an ADI in alternative embodiments. For example, different instances of the flag 42 may be associated with different callees in the set of authorized callees 44 (e.g. each callee in the set may have its own associated flag 42). Each flag may indicate whether a device identified by a respective ADI is privileged to make calls to a respective callee while the device is in an unregistered state. Using multiple flags, a system can withdraw a privilege of a particular device in an unregistered state to call a first callee without withdrawing a privilege of the particular device to call a second callee.

Embodiments are applicable to different multimedia networks and service providers regardless of technologies or protocols.

References herein to "excessive" and "excessive use" may be replaced with "abusive" and "abuse", respectively, to form additional embodiments.

Figure 4:
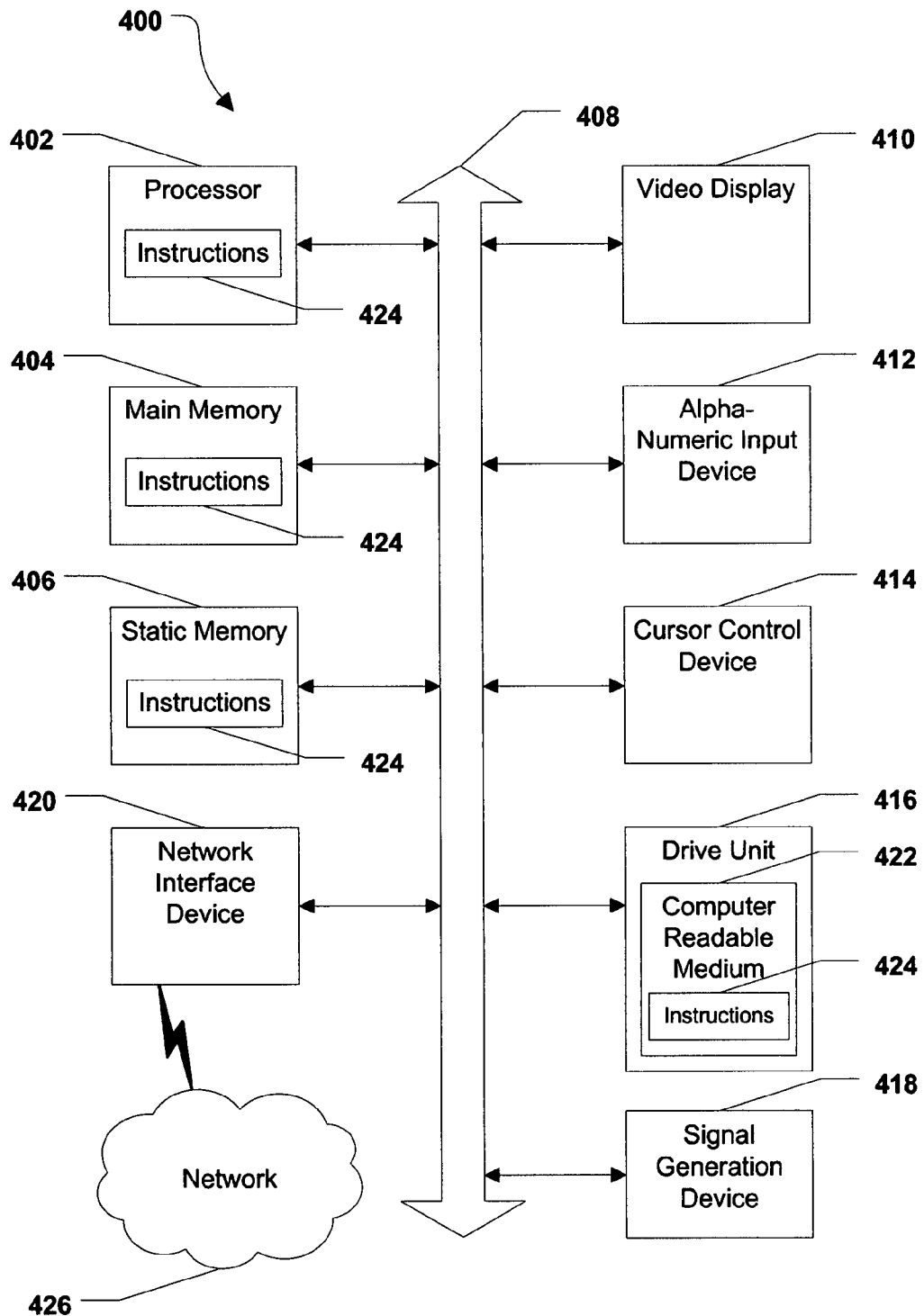
FIG. 4 is a block diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of protecting a telephone number mapping server from a denial of service attack, the method comprising:
    receiving a first call initiation request message associated with a first attempt to place a first exception call from an unregistered end user device;
    determining that a behavior of making exception call attempts is excessive based on the first call initiation request message and based on a behavior of making call requests of the unregistered end user device;
    inhibiting querying of a telephone number mapping server in connection with the first call initiation request message based on the determination that the behavior of making exception call attempts by the unregistered end user device is excessive;
    storing a value in a database, the value indicating that making subsequent exception calls from the unregistered end user device is disabled;
    receiving a second call initiation request message associated with a second attempt to place a second exception call from the unregistered end user device; and
    inhibiting querying of the telephone number mapping server in connection with the second call initiation request message based on the value in the database.

2. The method of claim 1 wherein the denial of service attack comprises a plurality of attempts to place exception calls from one or more end user devices that are unregistered.

3. The method of claim 1 wherein protecting the telephone number mapping server further comprises:
    receiving a third call initiation request message associated with a third attempt to place a third exception call from the unregistered end user device, wherein the third call initiation request is received before the first call initiation request; and
    querying the telephone number mapping server in response to the third call initiation request message.

4. The method of claim 1 further comprising:
    updating the value in the database, the updated value indicating that making subsequent exception calls from the unregistered end user device is re-enabled.

5. The method of claim 1 further comprising:
    determining a first behavior of making call attempts by the unregistered end user device over a first time period; and
    determining a second behavior of making call attempts by the unregistered end user device over a second time period, wherein the second time period differs from the first time period;
    wherein determining that the behavior of making exception call attempts of the unregistered end user device is excessive comprises determining that at least one of the first behavior and the second behavior is excessive.

6. The method of claim 1 wherein determining that the behavior of making exception call attempts of the unregistered end user device is excessive comprises determining that a count of a number of call attempts made from the unregistered end user device over a time period is greater than or equal to a threshold value.

7. The method of claim 1 wherein said determining that the behavior of making exception call attempts of the unregistered end user device is excessive comprises determining that a count of a number of call attempts made from the unregistered end user device to a particular callee over a time period is greater than or equal to a threshold value.

8. The method of claim 1 further comprising:
    sending an alarm message to a network operation center in response to determining that the behavior of making exception call attempts of the unregistered end user device is excessive.

9. The method of claim 8, wherein the alarm message is sent to the network operations center to cause the network operations center to contact a user, a law enforcement agency, or any combination thereof.

10. The method of claim 1, wherein the first exception call comprises a diagnostic call, a promotional call, a call for which provisioning is pending, a call for which porting is pending, or any combination thereof.

11. A system comprising:
a processor; and
a memory storing instructions executable by the processor to:
receive a first call initiation request message associated with a first attempt to place a first exception call from an unregistered end user device;
determine that a behavior of making exception call attempts is excessive based on the first call initiation request message and based on a behavior of making call requests of the unregistered end user device;
inhibit querying of a telephone number mapping server in connection with the first call initiation request message based on the determination that the behavior of making exception call attempts by the unregistered end user device is excessive;
store a value in a database, the value indicating that making subsequent exception calls from the unregistered end user device is disabled;
receive a second call initiation request message associated with a second attempt to place a second exception call from the unregistered end user device; and
inhibit querying of the telephone number mapping server in connection with the second call initiation request message based on the value in the database.

12. The system of claim 11 wherein the instructions are further executable by the processor to protect the telephone number mapping service from a denial of service attack, wherein the denial of service attack comprises a plurality of attempts to place exception calls from one or more end user devices that are unregistered.

13. The system of claim 11 wherein the instructions are further executable by the processor to:
determine that the behavior of making exception call attempts is excessive further based on a first count representing a first number of call requests by the unregistered end user device to an authorized callee.

14. The system of claim 11 wherein the database further stores counts of call request made by the unregistered end user device to each of a plurality of authorized callees during a plurality of time periods.

15. The system of claim 11 wherein the database further stores a set of allowed device identifiers that identify which unregistered end user devices are allowed to initiate call requests.

16. A non-transitory computer-readable medium encoded with a computer program, the computer program operable to execute a method to protect a telephone number mapping server from a denial of service attack, wherein protecting the telephone number mapping server comprises:
receiving a first call initiation request message associated with a first attempt to place a first exception call from an unregistered end user device to an authorized callee;
determining that a behavior of making exception call attempts is excessive based on the first call initiation request message and based on a behavior of making call requests of the unregistered end user device, wherein the behavior of making call requests by the unregistered end user device is indicated at least in part by a first number of call requests to the authorized callee;
inhibiting querying of a telephone number mapping server in connection with the first call initiation request based on the determination that the behavior of making exception calls by the unregistered end user device is excessive
storing a value in a database, the value indicating that making subsequent exception calls from the unregistered end user device is disabled;
receiving a second call initiation request message associated with a second attempt to place a second exception call from the unregistered end user device; and
inhibiting querying of the telephone number mapping server in connection with the second call initiation request based on the value in the database.

17. The non-transitory computer-readable medium of claim 16, wherein protecting the telephone number mapping server further comprises:
receiving a third call initiation request message associated with a third attempt to place a third exception call from the unregistered end user device, wherein the third call initiation request is received before the first call initiation request; and
querying the telephone number mapping server in response to the third call initiation request message.

18. The non-transitory computer-readable medium of claim 16, wherein protecting the telephone number mapping server further comprises storing a set of timestamps of a last call request made by the unregistered end user device to each of the set of authorized callees.

* * * * *